United States Patent
Boyko et al.

(10) Patent No.: US 8,818,609 B1
(45) Date of Patent: Aug. 26, 2014

(54) USING GEOMETRIC FEATURES AND HISTORY INFORMATION TO DETECT FEATURES SUCH AS CAR EXHAUST IN POINT MAPS

(71) Applicant: Google Inc., Mountain View, CA (US)

(72) Inventors: Aleksey S. Boyko, Plainsboro, NJ (US); Jiajun Zhu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 29 days.

(21) Appl. No.: 13/678,240

(22) Filed: Nov. 15, 2012

(51) Int. Cl.
*G05D 1/00* (2006.01)
*G01S 17/93* (2006.01)
*G01S 17/89* (2006.01)

(52) U.S. Cl.
CPC ............... *G01S 17/936* (2013.01); *G01S 17/89* (2013.01)
USPC .................... 701/28; 701/23; 701/26; 342/70; 356/438

(58) Field of Classification Search
CPC ....... G01S 17/026; G01S 17/88; G01S 17/89; G01S 17/93; G01S 17/936; G01S 7/4802; G01C 21/34
USPC ............... 701/1, 23, 25–28; 340/436; 342/70; 356/438
See application file for complete search history.

(56) References Cited

U.S. PATENT DOCUMENTS

| | | |
|---|---|---|
| 5,767,519 A | 6/1998 | Gelbwachs |
| 8,134,711 B2 | 3/2012 | Hager |
| 2009/0306881 A1* | 12/2009 | Dolgov et al. ................ 701/200 |
| 2010/0066587 A1* | 3/2010 | Yamauchi et al. ............... 342/70 |
| 2011/0224840 A1* | 9/2011 | Vanek ............................... 701/1 |

FOREIGN PATENT DOCUMENTS

EP 1 470 033 5/2008

OTHER PUBLICATIONS

Moosmuller et al., "On-Road Measurement of Automotive Particle Emissions by Ultraviolet Lidar and Transmissometer: Instrument", Environ. Sci. Technol., (2003), 37, pp. 4971-4978.
Mazzoleni et al., "Monitoring Automotive Particulate Matter Emissions with LiDAR: A Review", Remote Sensing, (2010) vol. 2, pp. 1077-1119.

* cited by examiner

*Primary Examiner* — Thomas Tarcza
*Assistant Examiner* — Kevin Myhre
(74) *Attorney, Agent, or Firm* — McDonnell Boehnen Hulbert & Berghoff LLP

(57) ABSTRACT

Disclosed herein are systems and methods for classifying regions of a scanning zone of a light detection and ranging (LIDAR) scan. One example includes a method for receiving information indicative of a light detection and ranging (LIDAR) scan of a vehicle. The method further involves generating a point map of the scanning zone. The method further involves generating a density profile of the point map that is indicative of density of one or more regions of the scanning zone characterized at one or more distances. The method further involves generating an elevation profile of the point map that is indicative of elevation of one or more reflected features in the scanning zone characterized at one or more distances. The method further involves classifying regions of the scanning zone based on the density profile and the elevation profile.

20 Claims, 12 Drawing Sheets

US 8,818,609 B1

USING GEOMETRIC FEATURES AND HISTORY INFORMATION TO DETECT FEATURES SUCH AS CAR EXHAUST IN POINT MAPS

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR device actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features can be generated based on the returning pulses for the entire scanning zone. The three-dimensional point map thereby indicates positions of reflective objects in the scanned scene.

SUMMARY

Some examples of the present disclosure provide a method including receiving information indicative of a light detection and ranging (LIDAR) scan of a vehicle, and the LIDAR scan may be characterized by a scanning zone. The method can include generating point map (such as, for example, a three-dimensional (3-D) point map) of the scanning zone. The method can also include generating a density profile of the point map, and the density profile may indicate density of one or more regions of the scanning zone characterized at one or more distances. The method can also include generating an elevation profile of the point map, and the elevation profile may indicate elevation of one or more reflected features in the scanning zone characterized at one or more distances. The method can also include classifying regions of the scanning zone based on the density profile and the elevation profile.

Some examples of the present disclosure provide an autonomous vehicle system. The autonomous vehicle system can include a LIDAR device. The autonomous vehicle can also include a controller configured to instruct the LIDAR device to scan the scanning zone. The controller can also be configured to generate a point map. The controller can also be configured to generate a density profile of the point map, and the density profile may indicate density of one or more regions of the scanning zone characterized at one or more distances. The controller can also be configured to generate an elevation profile of the point map, and the elevation profile may indicate elevation of one or more reflected features in the scanning zone characterized at one or more distances. The controller can also be configured to classify regions of the scanning zone based on the density profile and the elevation profile.

Some examples of the present disclosure provide a computer readable medium storing instructions that, when executed by one or more processors in a computing device, cause the computing device to perform functions. The functions may include receiving information indicative of a LIDAR scan of a vehicle, and the LIDAR scan can be characterized by a scanning zone. The functions can include generating a point map of the scanning zone. The functions can also include generating a density profile of the point map, and the density profile may indicate density of one or more regions of the scanning zone characterized at one or more distances. The functions can also include generating an elevation profile of the point map, and the elevation profile may indicate elevation of one or more reflected features in the scanning zone characterized at one or more distances. The functions can also include classifying regions of the scanning zone based on the density profile and the elevation profile.

These as well as other aspects, advantages, and alternatives, will become apparent to those of ordinary skill in the art by reading the following detailed description, with reference where appropriate to the accompanying drawings.

DETAILED DESCRIPTION

Figure 1:
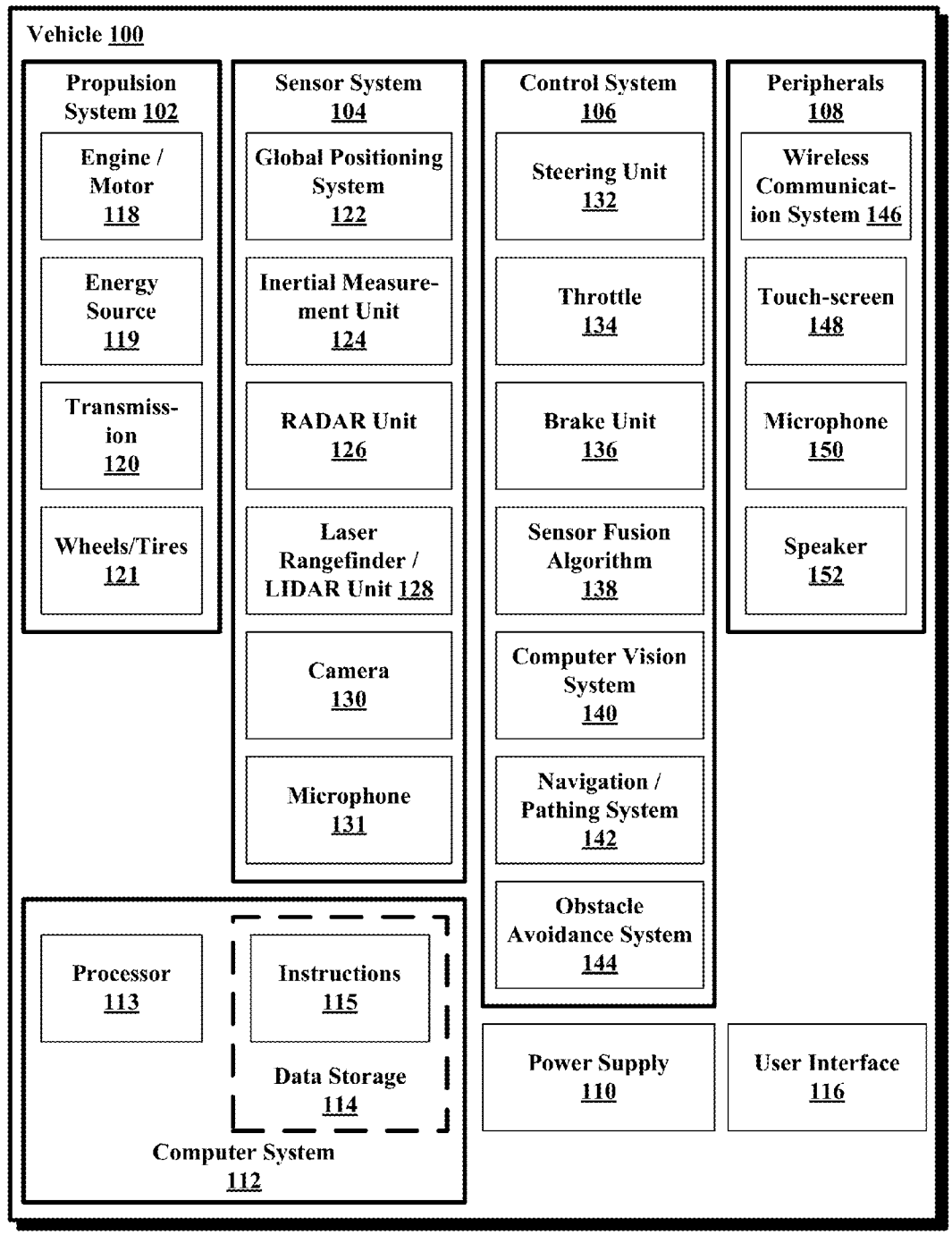
FIG. 1 is a functional block diagram depicting example aspects of an autonomous vehicle.

Example embodiments relate to an autonomous vehicle, such as a driverless automobile, that includes a light detection and ranging (LIDAR) device configured to actively detect reflective features in the environment surrounding the vehicle. A controller may be configured to analyze information from the LIDAR device to identify the surroundings of the vehicle. In some examples, the controller can determine how to direct propulsion systems of the vehicle to affect a navigation path that substantially avoids obstacles indicated by the information from the LIDAR device.

Each distance measurement of a scanning LIDAR may be associated with a point or "spot" on a reflective feature in the environment surrounding the LIDAR from which an emitted pulse is reflected. Scanning the LIDAR through a range of orientations provides a three-dimensional distribution of reflective points, which is referred to herein as a three-dimensional (3-D) point map or 3-D point cloud. Spatial features that appear in a 3-D point map generally correspond to objects detected by laser pulses from the LIDAR that bounce off the objects' surfaces. In generating such a 3-D point map, the object's distance and shape as revealed by the laser light that bounces off the object's surface can be detected as return pulses. In particular, an object detected by a scanning LIDAR and appearing as a feature in a 3-D point map may not have a solid surface, or even any solid portions within its volume. For example, a cloud of exhaust gas may be detected by a LIDAR and appear in a 3-D point map with either a well-defined shape, or an amorphous shape. Thus, a LIDAR detector can be sensitive to non-solid reflective features, even though such features may be safely disregarded for object avoidance and/or navigational purposes of the autonomous vehicle.

For some applications of a scanning LIDAR, it may be necessary or desirable to be able to distinguish between spatial features in a 3-D point map that correspond to detected objects that are at least partially solid and detected objects that are not. For example, a 3-D point map may serve as real-time input to an application and/or system that guides a moving vehicle through a region that may contain physical objects or obstacles in the vehicle's path. In such a situation, safe navigation of the vehicle through the region can depend on avoiding objects that represent collision hazards, such as solid objects, while minimizing or eliminating maneuvers around non-solid reflective features that correspond to objects or materials that could otherwise be safely passed through.

Without the ability to distinguish between solid reflective features and non-solid reflective features, autonomous vehicles can make undesirable maneuvers to the detriment of passenger safety, fuel economy, etc. For example, in cold weather, the exhaust of a car within the scanning zone of the LIDAR can appear reflective, and cause an automatic object avoidance system to unnecessarily maneuver the vehicle around the exhaust, even though such maneuvers are not warranted by a collision hazard.

In an example embodiment, a process for identifying the exhaust of a leading vehicle for navigational purposes of an autonomous vehicle includes determining a surface of a leading vehicle and then trailing back towards the LIDAR scanner (on the autonomous vehicle) to identify a boundary of the exhaust (e.g., where the exhaust begins). To locate the surface of the leading vehicle, the controller may be configured to acquire a density profile that describes the distribution of a number of points along a heading axis of the autonomous vehicle, and to identify a first high value in the profile, starting at a point from the LIDAR scanner. To locate a coordinate where exhaust of the leading vehicle begins, the controller can be configured to acquire a distribution of an elevation of maximal points along a heading axis. In one example, starting from the LIDAR scanner, the controller may track the elevation profile toward an end of the leading vehicle to identify a low elevation value. The location of either a low elevation value may be determined to be the location where the exhaust of the leading vehicle begins.

Additionally, for cases where geometry may not be useful to determine a desired result, the controller can be configured to use observations made about a given vehicle in the past to determine whether an object detected by the LIDAR is exhaust. The system may determine a bounding box for a vehicle (e.g., an area in which the vehicle is present) over time. Additionally, the history of the previous exhaust decisions about the vehicle can be tracked, as well as a map of the exhaust detected in the past. When a bounding box of a vehicle is tracked over time, portions of the vehicle that do not fit into the bounding box are more likely to be exhaust because solid structures will usually be persistently present in the scans, and will cause the bounding box to take them into account. Conversely, when, due to a sporadic event in scanning or the shape of the vehicle (e.g., low flatbed trailer), the geometric features suggest that a large part of a vehicle is exhaust, the fact that those parts of the vehicle have been persistently tracked prevents them from being discarded as non-solid objects.

In example embodiments, the example system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 may be configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

In some examples, the vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include or be executed using, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, wireless communication system 146 can communicate with a wireless local area network (WLAN), for example, using WiFi. In some embodiments, wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
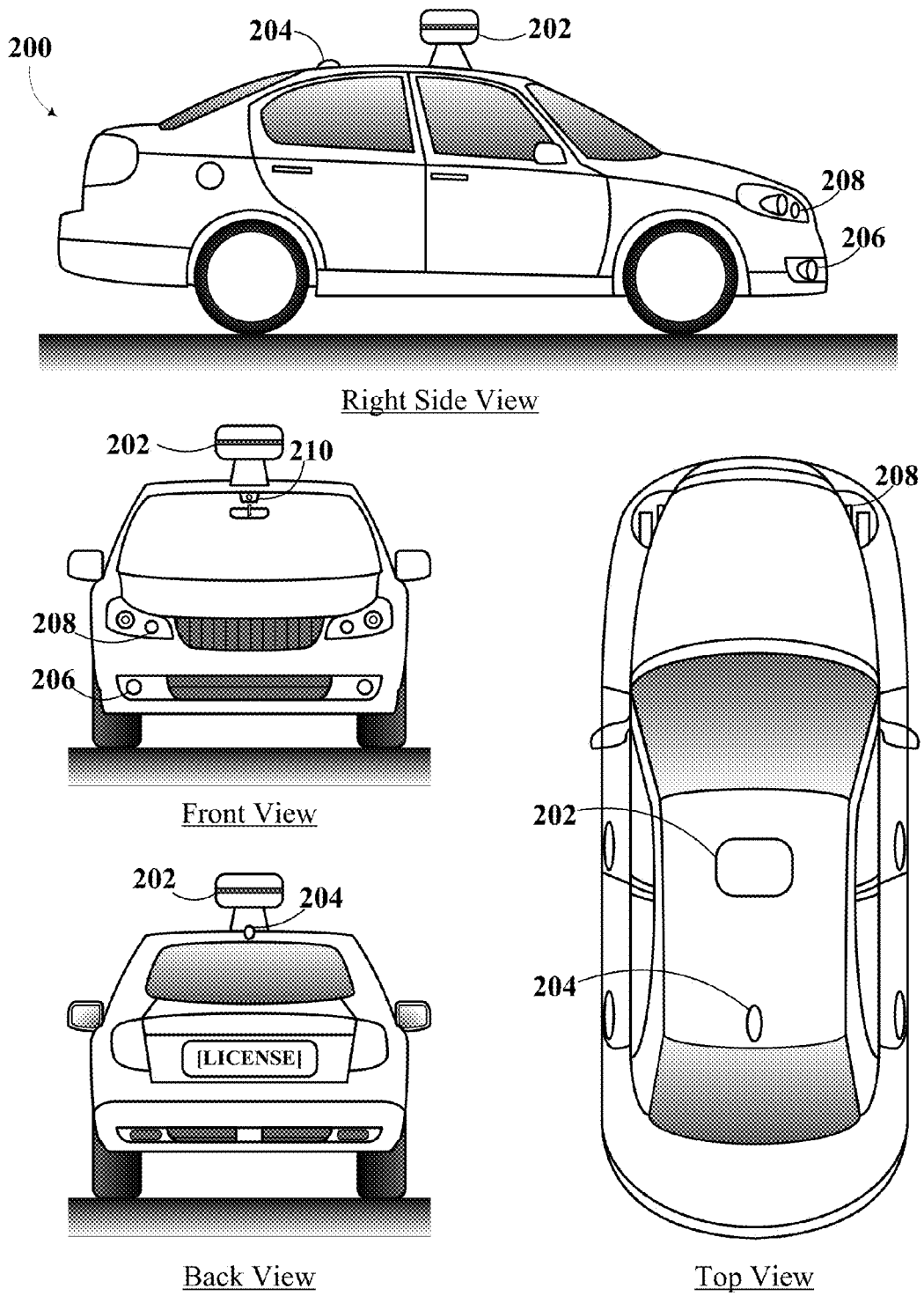
FIG. 2 depicts exterior views of the autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel sedan-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, a LIDAR unit 206, a laser rangefinder unit 208, and a camera 210. Furthermore, the example vehicle 200 can include any of the components described in connection with vehicle 100 of FIG. 1.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200.

The camera 210 can have associated optics operable to provide an adjustable field of view. Further, the camera 210 can be mounted to vehicle 200 with a movable mount to vary a pointing angle of the camera 210, such as a via a pan/tilt mechanism.

Figure 3A:
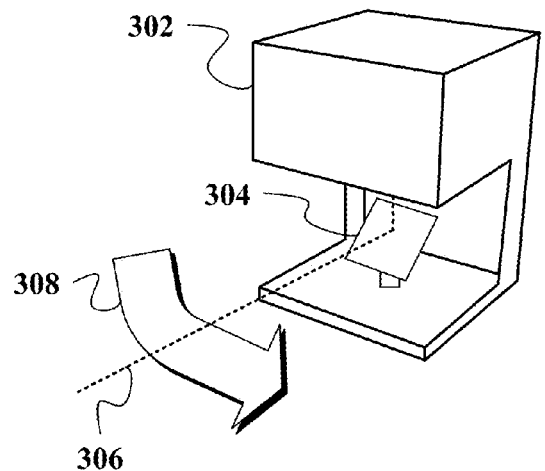
FIG. 3A provides an example depiction of a LIDAR device including beam steering optics.

FIG. 3A provides an example depiction of a light detection and ranging (LIDAR) device 302 including beam steering optics 304. A laser beam 306 is directed to the beam steering optics 304. In the example illustrated in FIG. 3A, the beam steering optics 304 includes a rotating angled mirror that directs the initially downward facing laser beam 306 to sweep across a scanning zone. As described herein, the beam steering optics 304, which can generally be implemented as a combination of lenses, mirrors, and/or apertures configured to direct the laser beam to sweep across a scanning zone, are interchangeably described as the rotating angled mirror 304. The rotating angled mirror 304 rotates about an axis substantially parallel, and roughly in line with, the initial downward path of the laser beam 306. The rotating angled mirror 304 rotates in the direction indicated by the reference arrow 308 in FIG. 3A.

Although rangefinder 302 is depicted as having (approximately) a 180 degree range of rotation for the scanning zone of the laser beam 306 via the rotating angled mirror 304, this is for purposes of example and explanation only, as the present disclosure is not so limited. Indeed, as explained above, LIDAR 302 can be configured to have viewing angle (e.g., angular range of available orientations during each sweep), including viewing angles up to and including 360 degrees. Further, although LIDAR 302 is depicted with the single laser beam 306 and a single mirror 304, this is for purposes of example and explanation only, as the present disclosure is not so limited. Indeed, as explained above, LIDAR 302 can include multiple laser beams operating simultaneously or sequentially to provide greater sampling coverage of the surrounding environment. The LIDAR 302 also includes, or works in concert with, additional optical sensors (not shown) configured to detect the reflection of laser beam 306 from features/objects in the surrounding environment with sufficient temporal sensitivity to determine distances to the reflective features. For example, with reference to the vehicle 200 in FIG. 2, such optical sensors can optionally be co-located with the top-mounted sensors 204 on the autonomous vehicle 200.

Figure 3B:
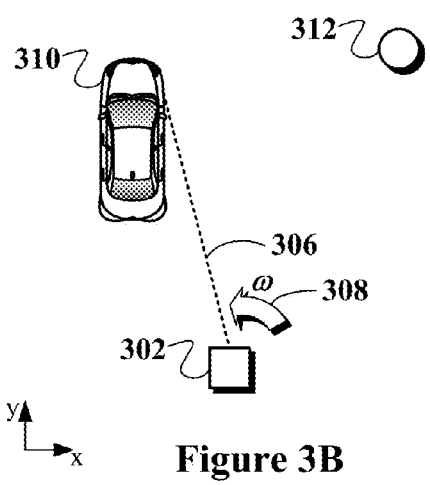
FIG. 3B illustrates an example LIDAR device scanning across an obstacle-filled environmental scene.

FIG. 3B symbolically illustrates the LIDAR device 302 scanning across an obstacle-filled environmental scene. The example vehicular environment depicted in FIG. 3B includes a car 310 and a tree 312. In operation, LIDAR 302 rotates according to motion reference arrow 308 with angular velocity $\omega$. While rotating, the LIDAR 302 regularly (e.g., periodically) emits laser beams, such as the laser beam 306. Reflections from the emitted laser beams by objects in the environment, such as vehicle 310 and tree 312, are then received by suitable sensors. Time-stamping the receipt of the reflected signals allows for associating each reflected signal (if any is received at all) with the most recently emitted laser pulse, and measuring the time delay between emission of the laser pulse and reception of the reflected light. The time delay provides an estimate of the distance to the reflective feature by scaling according to the speed of light in the intervening atmosphere. Combining the distance information for each reflected signal with the orientation of the LIDAR device 302 for the respective pulse emission allows for determining a position of the reflective feature in three-dimensions. For illustrative purposes, the environmental scene in FIG. 3B is described in the two-dimensional x-y plane in connection with a single sweep of the LIDAR device 302 that estimates positions to a series of points located in the x-y plane. However, it is noted that a more complete three-dimensional sampling is provided by either adjusting the beam steering optics 304 to direct the laser beam 306 up or down from the x-y plane on its next sweep of the scene or by providing additional lasers and associated beam steering optics dedicated to sampling point locations in planes above and below the x-y plane shown in FIG. 3B, or combinations of these.

Figure 3C:
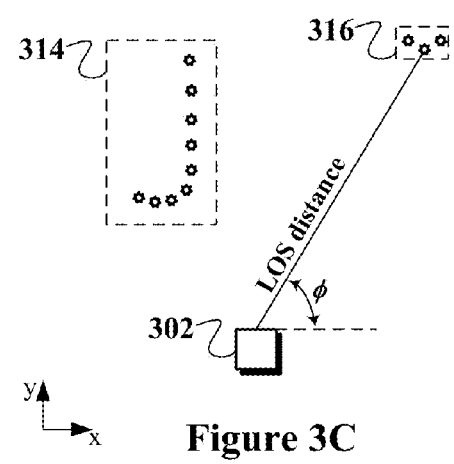
FIG. 3C illustrates an example point cloud corresponding to the obstacle-filled environmental scene of FIG. 3B.

FIG. 3C symbolically illustrates a point cloud corresponding to the obstacle-filled environmental scene of FIG. 3B. Spatial-point data (represented by stars) are shown from a ground-plane (or aerial) perspective. Even though the individual points are not equally spatially distributed throughout the sampled environment, adjacent sampled points can be roughly equally angularly spaced with respect to the LIDAR device 302. Car spatial data 314 correspond to measured points on the surface of the car 310 with a line of sight to the LIDAR device 302. Similarly, tree spatial data 316 correspond to measured points on the surface of the tree 312 visible from the LIDAR device 302.

Each point in the example point cloud illustrated symbolically in FIG. 3C can be referenced by an azimuth angle $\phi$ (e.g. orientation of the LIDAR device 302 while emitting the pulse corresponding to the point, which is determined by the orientation of the rotating angled mirror 304) and a line-of-sight (LOS) distance (e.g., the distance indicated by the time delay between pulse emission and reflected light reception). For pulses that do not result in a returning reflected signal, the distance in the 3-D point map can optionally be set to the maximum distance sensitivity of the LIDAR device 302. The maximum distance sensitivity can be determined according to the maximum time delay the associated optical sensors wait for a return reflected signal following each pulse emission, which can itself be set according to the anticipated signal strength of a reflected signal at a particular distance given ambient lighting conditions, intensity of the emitted pulse, predicted reflectivity of environmental features, etc. In some examples, the maximum distance can be approximately 60 meters, 80 meters, 100 meters, or 150 meters, but other examples are possible for particular configurations of the LIDAR device 302 and associated optical sensors.

In some embodiments, the sensor fusion algorithm 138, computer vision system 140, and/or computer system 112 illustrated in FIG. 1, can be configured to interpret the car spatial data 314 alone and/or in combination with additional sensor-indicated information and/or memory-based pattern-matching point clouds and/or baseline maps of the environment to categorize or identify the group of points 314 as corresponding to the car 310. Similarly, the tree spatial data 316 can identified as corresponding to the tree 310 in accordance with a suitable object-detection technique. As described further herein, some embodiments of the present disclosure provide for identifying a region of the point cloud for study with enhanced resolution scanning technique on the basis of the already-sampled spatial-points.

Further, as noted above, each spatial point can be associated with a respective laser from a set of lasers and a respective timestamp. That is, in an embodiment where the LIDAR 302 includes multiple lasers, each respective received spatial point can be associated with the particular laser that was detected in accordance with the respective received spatial point. Additionally, each respective spatial point can be associated with a respective timestamp (e.g., a time at which laser was emitted or received). In this way, the received spatial points may be organized, identified, or otherwise ordered on a spatial (laser identification) and/or temporal (timestamp) basis. Such an ordering may assist or improve an analysis of the spatial-point data by allowing for organizing the spatial-point data into a meaningful order.

Figure 4A:
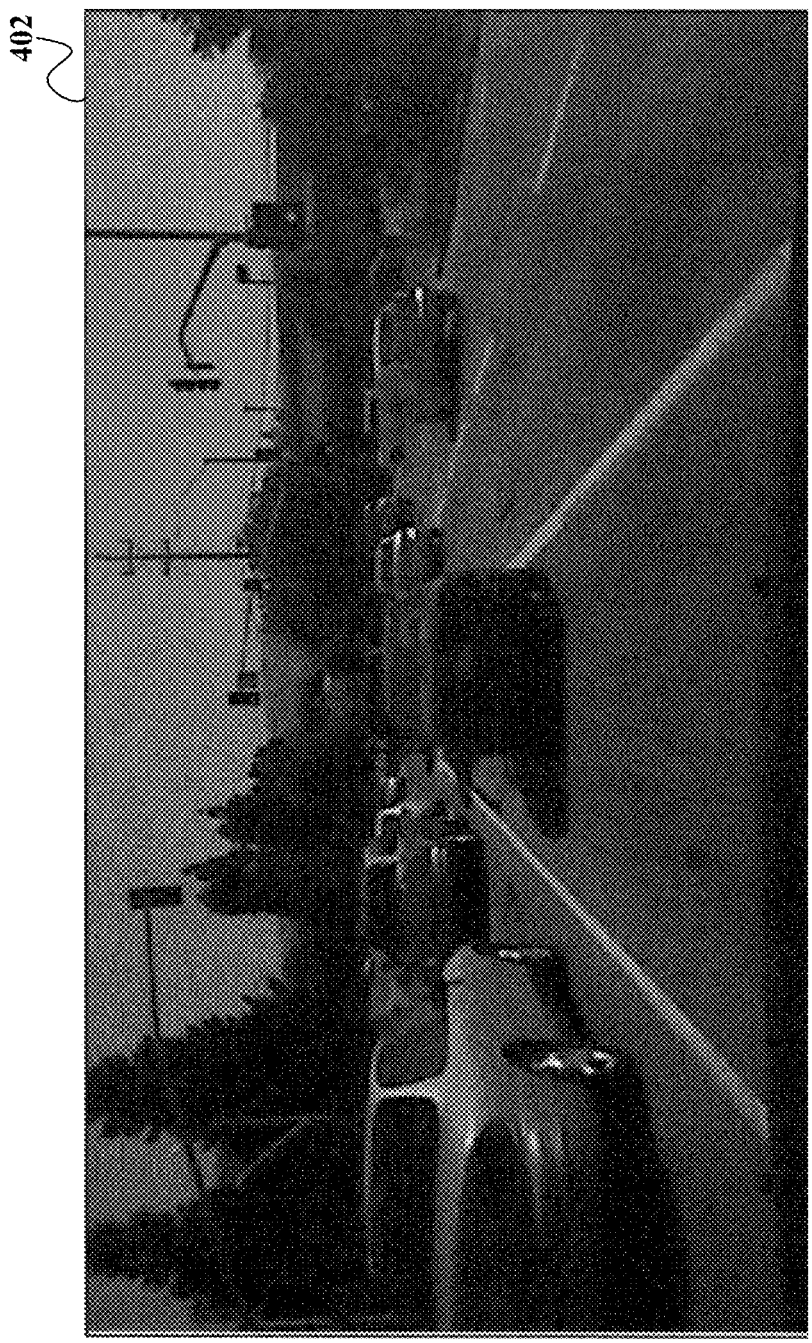
FIG. 4A is an image of an example roadway approaching an intersection.
Figure 4B:
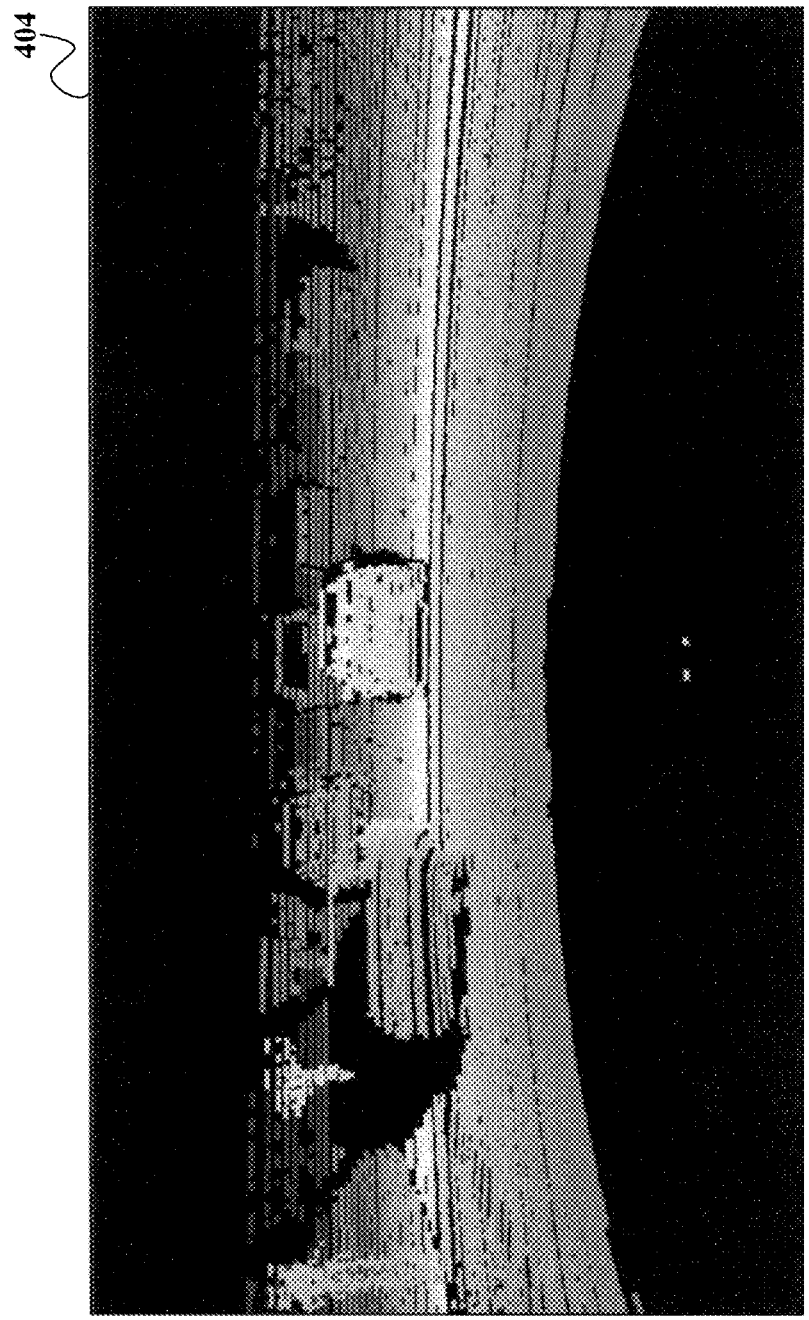
FIG. 4B is a rendering of an example LIDAR-indicated point cloud corresponding to the scene pictured in FIG. 4A.
Figure 4C:
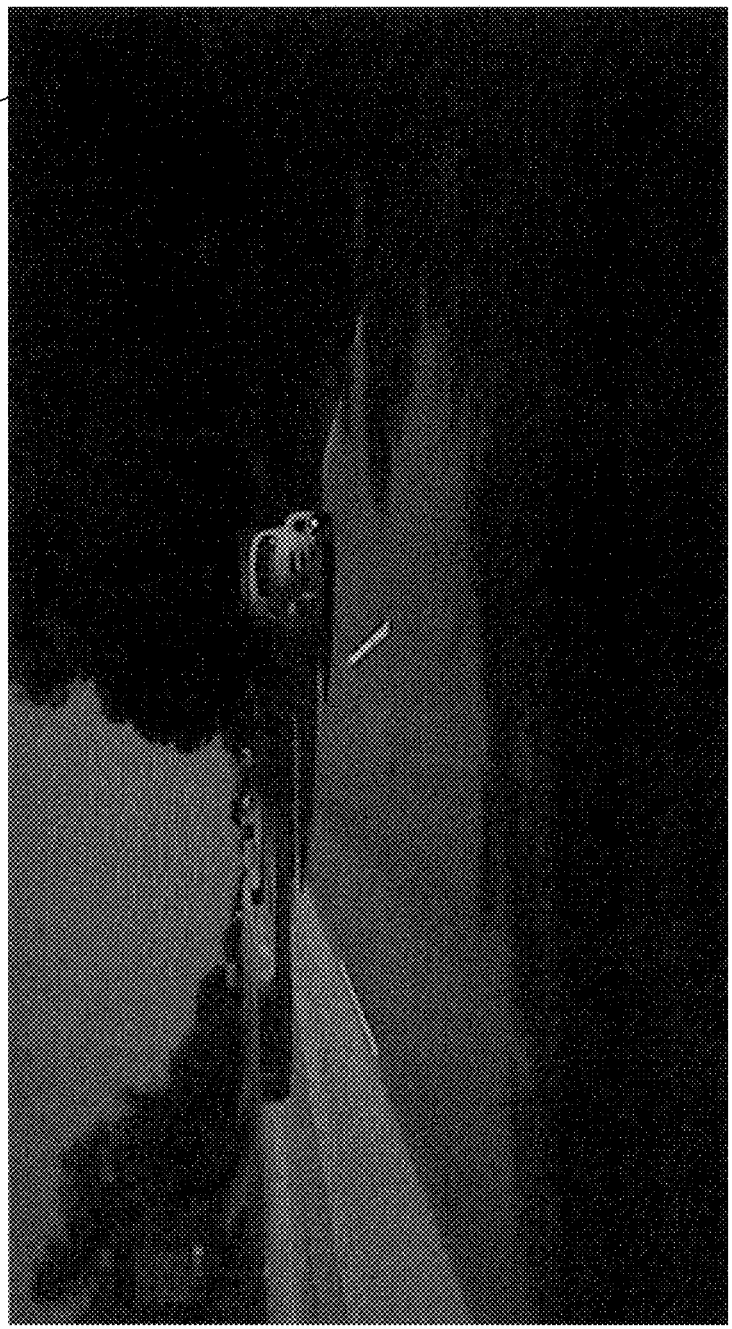
FIG. 4C is an image of another example roadway.
Figure 4D:
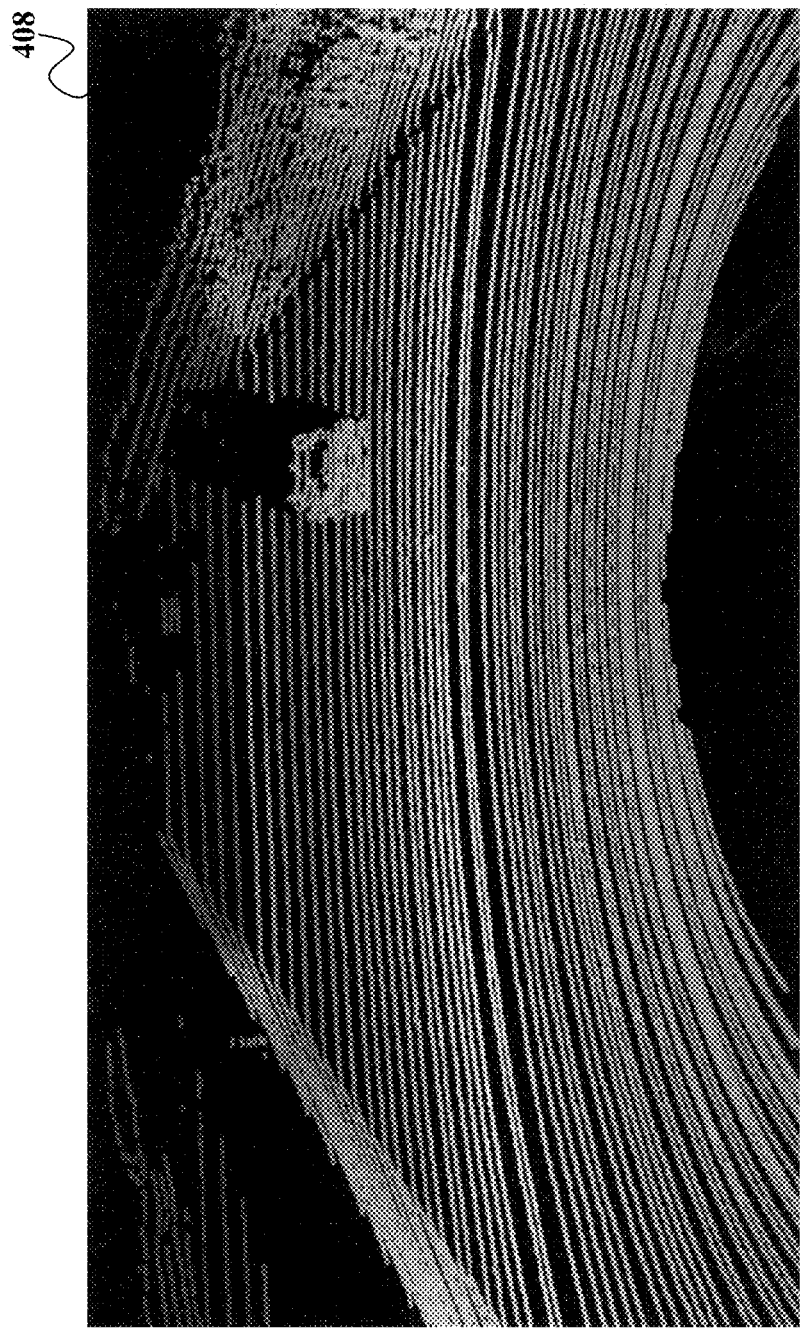
FIG. 4D is a rendering of an example LIDAR-indicated point cloud corresponding to the scene pictured in FIG. 4C.

FIG. 4A is a conceptual raw camera image of an example roadway scene 402 approaching an intersection. FIG. 4B is an example rendering of a LIDAR-indicated point cloud 404 corresponding to the scene 402 pictured in FIG. 4A. FIG. 4C is a conceptual raw camera image of another example roadway scene 406. FIG. 4D is an example rendering of a LIDAR-indicated point cloud 408 corresponding to the scene 406 pictured in FIG. 4C.

With reference to the vehicle 200 of FIG. 2, the camera images 402, 406 of FIGS. 4A and 4C can be captured by the camera 210 of the vehicle 200, and the corresponding point cloud maps 404, 408 of FIGS. 4B and 4D can be captured or generated by the LIDAR device 206. As shown in the examples of FIGS. 4B and 4D, a laser point cloud image may substantially or approximately correspond to a raw camera image captured by a camera. Moreover, FIGS. 4B and 4D show that LIDAR-indicated point cloud maps for the distinct environmental scenes 402, 406 (i.e., the images in FIGS. 4A and 4C) result in distinct point maps 404, 408 which correspond to their respective scenes. For clarity it is noted that each "line" depicted in FIGS. 4B and 4D generally corresponds to a series of spatial points collected by a particular, single, laser of LIDAR 206.

For purposes of context, example, and explanation, an overview of general approaches to object detection is provided below in connection with an example LIDAR device. As noted above, example vehicle 100 includes a LIDAR device 128. The LIDAR device 128 actively captures laser point cloud images using one or more lasers. The laser point cloud includes many points for each pulse emitted from the LIDAR device 128; reflected signals indicate actual locations of reflective objects, whereas failing to receive reflected signals indicate an absence of sufficiently reflective objects within a particular distance along the line of sight of the laser. Depending on factors including the laser pulse rate, the scene refresh rate, the total solid angle sampled by each LIDAR device (or just the total solid angle of the scene, where only one LIDAR device is used), the number of sample points in each point cloud can be determined. Some embodiments can provide point clouds with as many as 50,000 laser-indicated points, 80,000 laser-indicated points, 100,000 laser-indicated points, etc. Generally, the number of laser-indicated points in each point cloud is a tradeoff between angular resolution on the one hand, and refresh rate on the other hand. The LIDAR device is driven to provide an angular resolution at a sufficiently high refresh rate to be relevant to real time navigational decisions for an autonomous vehicle. Thus, the LIDAR device 128 can be configured to capture one or more laser point clouds of the scanning zone at predetermined time intervals, such as 100 milliseconds (to achieve a refresh rate of 10 frames per second), 33 milliseconds (to achieve a refresh rate of 30 frames per second), 1 millisecond, 1 second, etc.

Data storage 114 of computer system 112 of vehicle 100 can store object-detector software, code, or other program instructions. Such object-detector software can include, or be part of, one or more of the control systems 106 described above, including the sensor fusion algorithm 138, computer vision system 140, and/or obstacle avoidance system 144. The object detector may be any configuration of software and/or hardware configured to perceive features in the environmental scene by categorizing and/or identifying objects based on the laser point clouds captured by the LIDAR 128 and/or based on one or more of the sensors in sensor system 104. As a laser point cloud is captured via LIDAR 128, data indicative of the captured point cloud is communicated to the object detector, which analyzes the data to determine whether there is an object present in the laser point cloud. Objects indicated by the point cloud may be, for example, a vehicle, a pedestrian, a road sign, a traffic light, a traffic cone, etc.

To determine whether an object is present in a laser point cloud image, the object detector software and/or module can associate arrangements of laser-indicated points with patterns matching objects, environmental features, and/or categories of objects or features. The object detector can be pre-loaded (or dynamically instructed) to associate arrangements according to one or more parameters corresponding to physical objects/features in the environment surrounding the vehicle 100. For example, the object detector can be pre-loaded with information indicating a typical height of a pedestrian, a length of a typical automobile, confidence thresholds for classifying suspected objects, etc.

When the object detector identifies an object in point cloud, the object detector can define a bounding box encompassing that object. For example, the bounding box can correspond to a predicted exterior surface of the point cloud indicated object. Of course, the bounding "box" can generally take the form of a multi-sided closed shape defining the predicted outer boundaries of the object.

For each captured point cloud, positions of perceived objects and their corresponding boundary definitions are associated with a frame number or frame time. Thus, similarly shaped objects appearing in roughly similar locations in successive scans of the scene can be associated with one another to track objects in time. For perceived objects appearing in multiple point cloud frames (e.g., complete scans of the scanning zone), the object can be associated, for each frame on which the object appears, with a distinct bounding shape defining the dimensional extent of the perceived object.

Perceived objects can be tracked as the vehicle 100 travels through its surrounding environment and/or as objects move with respect to the vehicle so as to pass through the scanning zone of the LIDAR device 128. Combining two or more successively captured point clouds can thereby allow for determining translation information for detected objects. Future position predictions can be made for objects with characterized motion profiles, such as by observing acceleration and/or velocity of objects such as cars moving along the roadway with the vehicle 100 to predict the location of the object during a subsequent scan. In some embodiments, objects moving through the air are assumed to move along a trajectory influenced by the force of gravity.

To assist in providing object recognition, the vehicle 100 can also be in communication with an object-identification server (e.g., via the wireless communication system 146). The object-identification server can verify and/or classify objects detected by vehicle 100 using the object detector. Moreover, the object-identification server can facilitate optimization of one or more of the parameters used by the object detector to detect objects in the captured laser point cloud based on accumulated data from other similar systems, local conditions. In one embodiment, vehicle 100 can communicate the object boundaries, and their corresponding object parameters, to the object identification server for verification that the perceived objects are correctly identified, such as indicated by an evaluation for statistical likelihood of correct identification.

Figure 5:
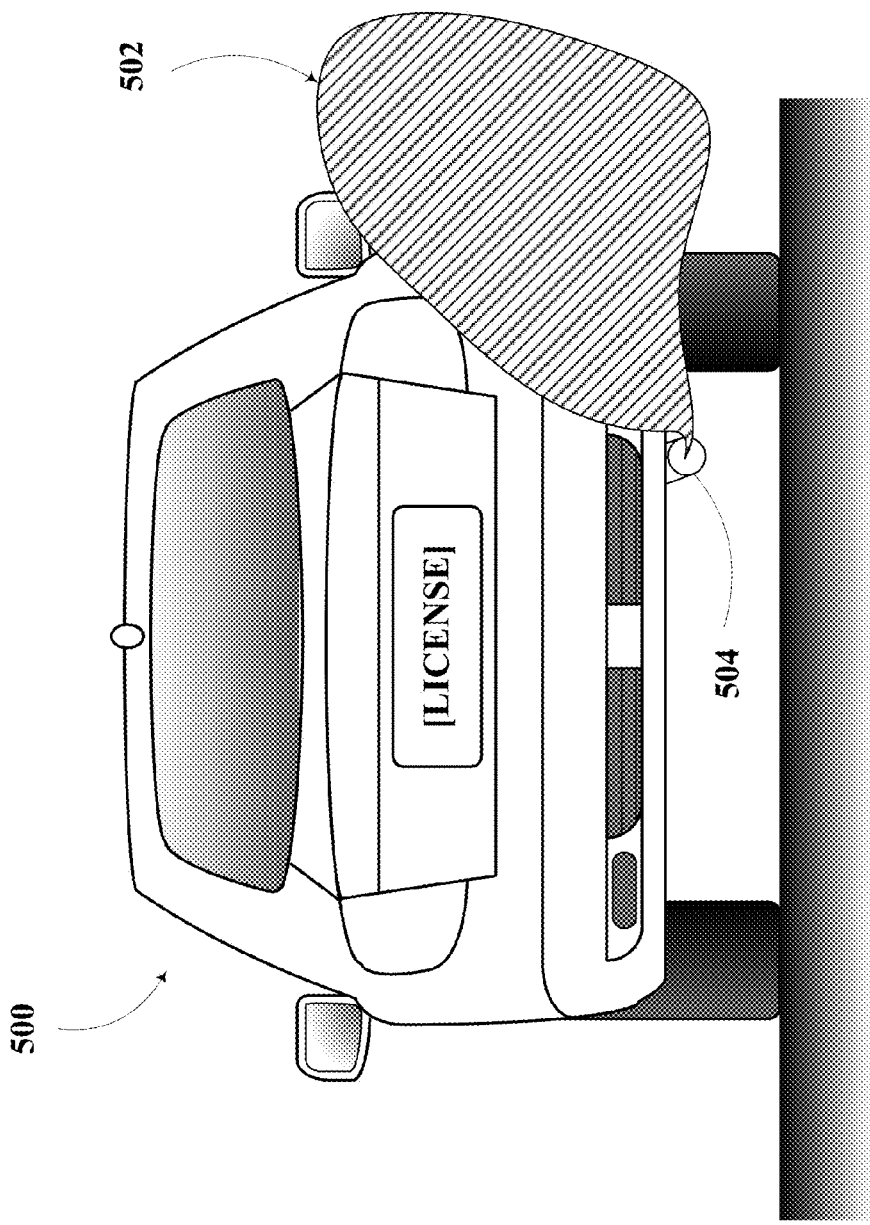
FIG. 5 is a back view of an example car emitting a plume of exhaust gas from a rear tail pipe.

As described above, for an autonomous vehicle configured to automatically adjust navigational decisions so as to avoid obstacles perceived in the path of the vehicle, it is desirable to differentiate between non-solid features that do not present obstacles and solid features that do. FIG. 5 is an example back view of a car 500 emitting a plume 502 of exhaust gas from a rear tail pipe 504. Other vehicles are also possible, such as a motorcycle, truck, all-terrain vehicle, or any other vehicle that emits exhaust. The tail pipe 504 discharges exhaust gas from a combustion chamber inside an engine of the car 500 that converts chemical fuel energy to mechanical energy to power the car 500. The exhaust gas is generally at a higher temperature than ambient air, and so the gas disperses from the tail pipe 504 in a plume pattern 502 characterized by the tendency of the heated gas to rise in the ambient air and also disperse by convection according to the direction of prevailing winds. Furthermore, while the car 500 is in motion, the exhaust plume 502 generally trails behind the car 500. The exhaust plume 502 is formed by a combination of heated gases (e.g., nitrogen, oxygen, water vapor, carbon dioxide, carbon monoxide, etc.) and particulates (e.g., hydrocarbons, soot, oxides, etc.) that disperse to the ambient air from the tail pipe 504. Upon emission, the gases thermally regulate with the surrounding air, and the constituents of the exhaust gas diffuse to the surrounding air such that the exhaust becomes substantially indistinguishable. The characteristic exhaust plume 502 is therefore continuously regenerated by exhausted heated gases and particulates emitted from the tail pipe 504 so as to maintain the characteristic plume pattern 502.

To a LIDAR device 302, which detects and locates optically reflective features, the exhaust plume 502 resembles a reflective cloud, because light pulses are reflected from the particulates, such as water droplets, particulates due to incomplete exhaustion reactions, etc., dispersed throughout the exhaust cloud 502. The temperature of the ambient air can influence the perception of the exhaust plume 502. For example, water droplets formed by condensation within the exhausted gases are formed more quickly (i.e., closer to the tail pipe 504) when the ambient temperature is cold than when the ambient temperature is hot and condensation occurs more slowly (i.e., further from the tail pipe 504). Thus, the exhaust plume 502 can be more readily apparent on cold days, because water droplets are formed in greater numbers closer to the tail pipe 504 and the spatial density of reflective water droplets near the tail pipe 504 is increased. Similarly, the exhaust plume 502 can be more readily apparent immediately after a car is started while it is still warming up, because the exhaust gases emitted from the tail pipe 504 are relatively colder than after the exhaust gases warm to their normal operating temperature, and as a result water droplets form more readily closer to the tail pipe 504. Additionally, when a car is started up after being unused for a period of time, the exhaust stream picks up and blows out the condensate that built up in the exhaust systems (e.g., overnight). Therefore, the exhaust plume 502 may be more readily apparent immediately after a car is started.

Figure 6:
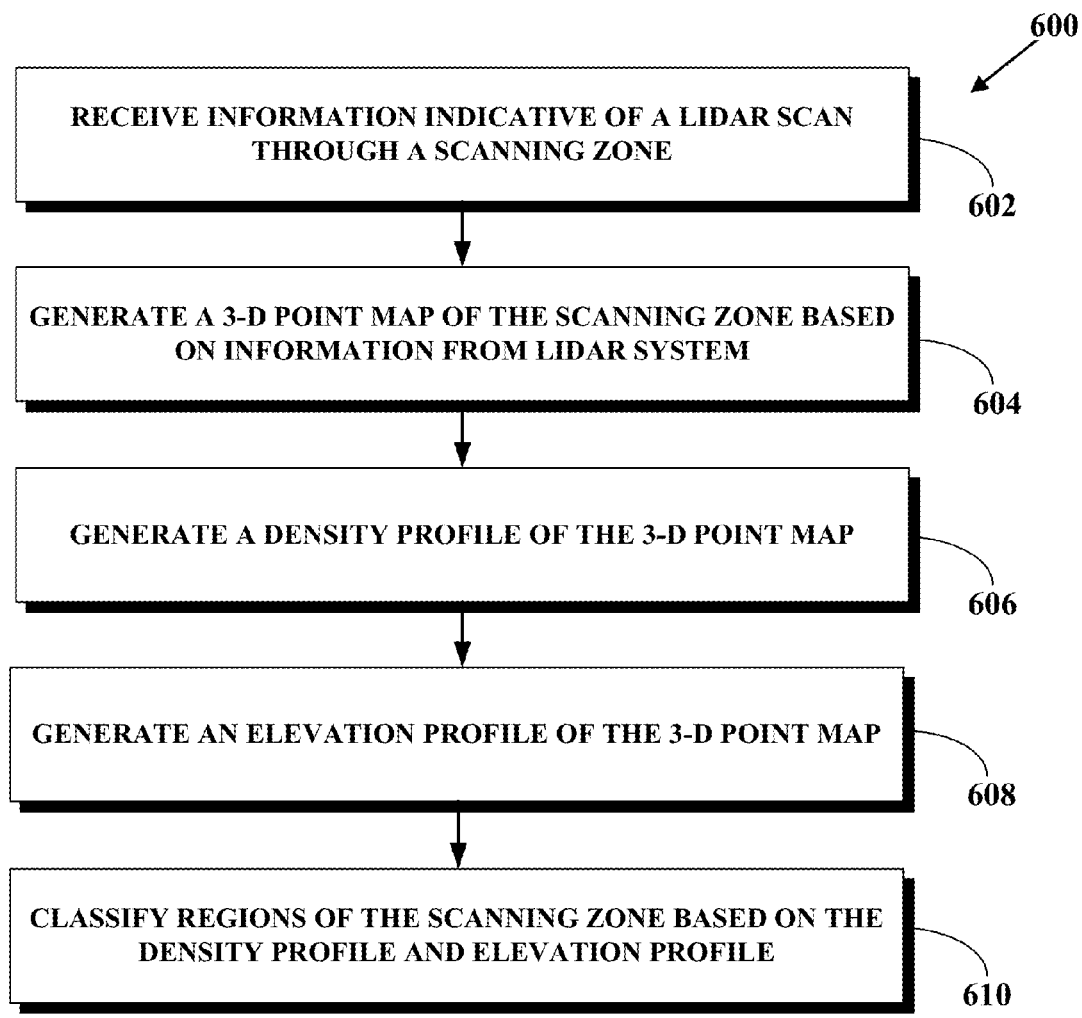
FIG. 6 is a flowchart of an example process for classifying regions of the scanning zone of a LIDAR scan.

FIG. 6 is a flowchart of a method 600 for classifying regions of the scanning zone of a LIDAR device 302. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At block 602, the method 600 includes receive information indicative of a LIDAR scan through a scanning zone. In some examples, the information can be received by the computer system 112. The LIDAR may be associated with a vehicle, and the scanning zone may be or include an area in front, behind, or to a side of the vehicle. In some examples, the scanning zone may be configured to be directed to a vehicle in front of the vehicle on which the LIDAR is positioned.

At block 604, the method 600 includes generate a 3-D point map of the scanning zone based on information from the LIDAR system. The computer system 112 may be configured to generate a 3-D point map of positions of reflective features in the scanning zone, as discussed above.

At block 606, the method 600 includes generate a density profile of the 3-D point map. In some examples, the density profile is generated by the computer system 112. The density profile of the 3-D point map is indicative of the density of one or more regions in the scanning zone at one or more distances from the LIDAR device 302. The density of the 3-D point map at a given distance from the LIDAR device 302 can be determined by calculating the number of reflected points at that distance. The more reflective points from the LIDAR scan, the greater the density of the 3-D point map at that distance. A density profile may illustrate a density calculation with respect to the distance from the LIDAR device 302. In one embodiment, the density can be calculated at 10 cm increments up to 10 m from the LIDAR device 302. Other increments and distances are possible.

At block 608, the method 600 includes generate an elevation profile of the 3-D point map. In some examples, the elevation profile is generated by the computer system 112. The elevation profile of the 3-D point map is indicative of the elevation of one or more features in the scanning zone at one or more distances from the LIDAR device 302. The elevation of a feature in the scanning zone can be determined by calculating the distance from the ground to the feature. An elevation profile may illustrate the elevation calculation with respect to the distance from the LIDAR device 302. In one embodiment, the elevation can be calculated at 10 cm increments up to 10 m from the LIDAR device 302. Other increments and distances are possible.

At block 610, the method 600 includes classify regions of the scanning zone based on the density profile and elevation profile. In one embodiment, classifying regions of the scanning zone comprises making a decision of whether a feature in the scanning zone includes an exhaust plume. In another embodiment, classifying regions of the scanning zone comprises determining whether a feature in the scanning zone includes a solid material. Other embodiments are possible as well.

Figure 7:
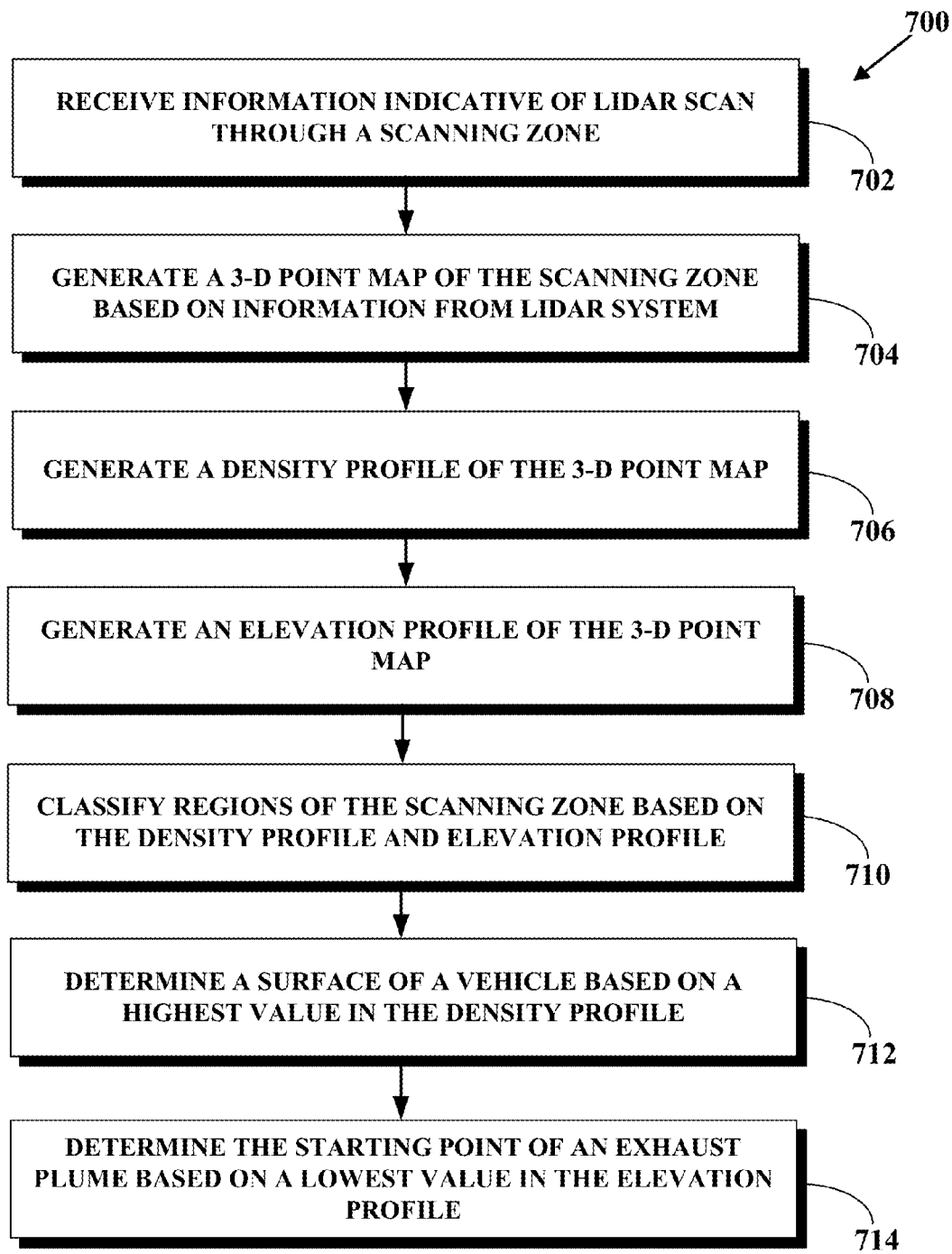
FIG. 7 is a flowchart of an example process for determining a surface of a vehicle and the starting point of an exhaust plume.

FIG. 7 is a flowchart of a method 700 for determining a surface of a vehicle and the starting point of an exhaust plume. At block 702, the method includes receive information indicative of a LIDAR scan through a scanning zone. In some examples, the information can be received by the computer system 112.

At block 704, the method 700 includes generate a 3-D point map of the scanning zone based on information from the LIDAR system. The computer system 112 may be configured to generate a 3-D point map of positions of reflective features in the scanning zone, as discussed above.

At block 706, the method 700 includes generate a density profile of the 3-D point map. In some examples, the density profile is generated by the computer system 112. The density profile of the 3-D point map is indicative of the density of one or more regions in the scanning zone at one or more distances from the LIDAR device 302. The density of the 3-D point map at a given distance from the LIDAR device 302 can be determined by calculating the number of reflected points at that distance. The more reflective points from the LIDAR scan, the greater the density of the 3-D point map at that distance. A density profile may illustrate a density calculation with respect to the distance from the LIDAR device 302. In one embodiment, the density can be calculated at 10 cm increments up to 10 m from the LIDAR device 302. Other increments and distances are possible.

At block 708, the method 700 includes generate an elevation profile of the 3-D point map. In some examples, the elevation profile is generated by the computer system 112. The elevation profile of the 3-D point map is indicative of the elevation of one or more features in the scanning zone at one or more distances from the LIDAR device 302. The elevation of a feature in the scanning zone can be determined by calculating the distance from the ground to the feature. An elevation profile may illustrate the elevation calculation with respect to the distance from the LIDAR device 302. In one embodiment, the elevation can be calculated at 10 cm increments up to 10 m from the LIDAR device 302. Other increments and distances are possible.

At block 710, the method 700 includes classify regions of the scanning zone based on the density profile and elevation profile. In one embodiment, classifying regions of the scanning zone comprises the computer system 112 making a decision of whether a feature in the scanning zone includes an exhaust plume. In another embodiment, classifying regions of the scanning zone comprises the computer system 112 determining whether a feature in the scanning zone includes a solid material. Other embodiments are possible as well.

At block 712, the method 700 includes determine a surface of a vehicle based on the highest value in the density profile. In some examples, the determination can be made by the computer system 112. The vehicle is located in the scanning zone of the LIDAR device, and is an obstacle around which the autonomous vehicle must maneuver. The highest value in the density profile is determined by looking for the first high density value, starting from the LIDAR device and moving along the heading axis of the autonomous vehicle. In some cases, the highest value in the density profile will be the rear surface of the vehicle. For example, the density profile of a van with a flat rear surface will show the highest value at the rear of the vehicle, since several reflected points will be located at the rear surface of the vehicle. In other cases, the highest value in the density profile will not be the rear surface of the vehicle. For example, the density profile of a low flatbed pickup truck will show the highest value in the density profile at the rear of the cabin of the pickup truck, not the rear of the pickup truck itself. Therefore, it is useful to also determine the starting point of an exhaust plume to locate the rear surface of a vehicle.

At block 714, the method 700 includes determine the starting point of an exhaust plume based on the lowest value in the elevation profile. In some examples, the determination can be made by the computer system 112. The lowest value in the elevation profile is determined by looking for the first low elevation value, starting from the LIDAR device and moving along the heading axis of the autonomous vehicle. Referring to FIG. 5, since a tail pipe 504 is generally very close to the ground, a low value in an elevation profile signifies the starting point of an exhaust plume 502. Once the vehicle surface is identified and the starting point of the exhaust plume is determined, it can be determined what regions of the 3-D point cloud includes an exhaust plume (and can therefore be discarded when making obstacle avoidance decisions), and what regions of the 3-D point cloud includes a solid material.

Figure 8A:
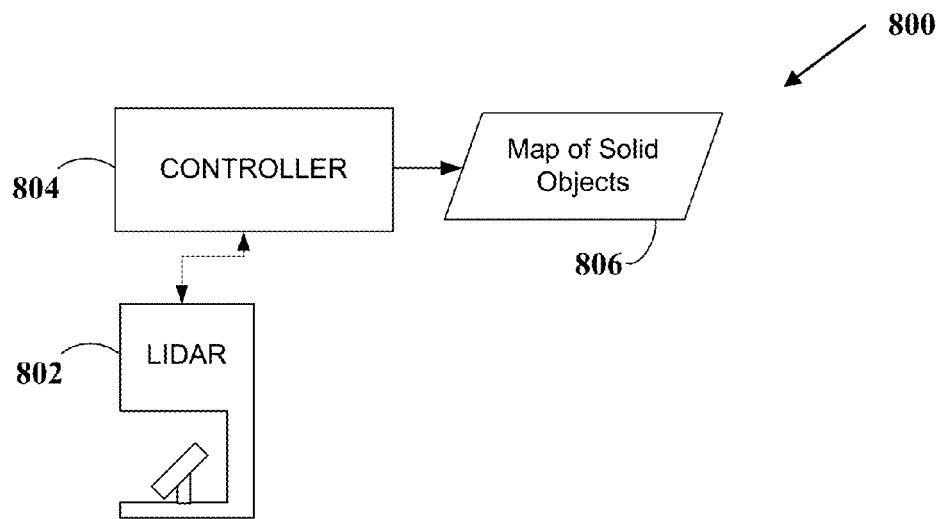
FIG. 8A is a block diagram of an example system for determining whether a LIDAR indicated feature includes a solid material

FIG. 8A is a block diagram of a system for determining whether a LIDAR indicated feature includes a solid material. The system 800 includes the LIDAR device 802 configured to detect and locate objects in a scanning zone mapped by the system 800. In some embodiments, the LIDAR device 802 can be mounted to the autonomous vehicle 200, such as in the LIDAR unit 206 and/or sensor unit 202.

A controller 804 is in communication with the LIDAR device 802 to send and receive data. The controller 804 can, for example, send command and control instructions to the LIDAR device 802 to cause the LIDAR device 802 to carry out measurements in a specified region and/or at a specified time. The controller 804 can also, for example, receive data indicative of three dimensional locations of reflective points in the surrounding environment (e.g., from the LIDAR device 802).

In the system 800, the controller 804 operates the LIDAR device 802 to characterize reflective features indicated by the LIDAR device 802. The controller 804 interprets the characterized reflective features to associate the reflective features with either solid materials or not solid materials and outputs a map of solid objects 806 in the environment surrounding the system 800.

Figure 8B:
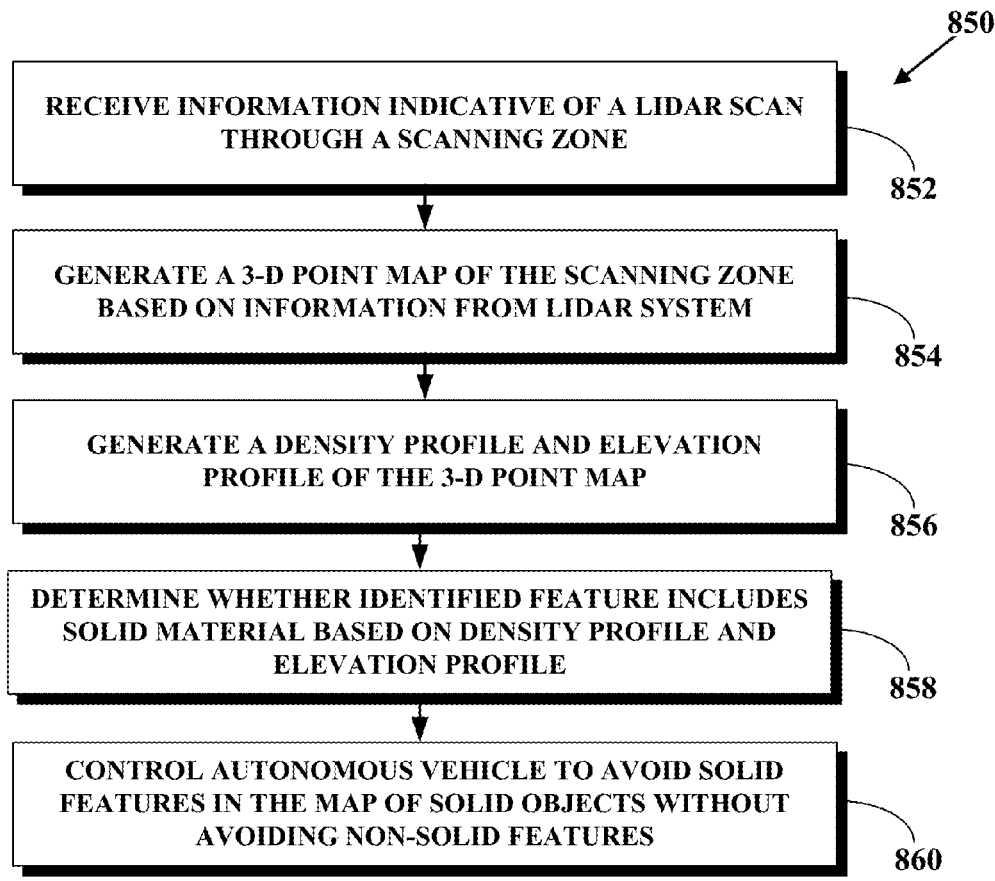
FIG. 8B is a flowchart of an example process for navigating an autonomous vehicle according to environmental feedback information from a LIDAR device.

FIG. 8B is a flowchart of a method 850 for navigating an autonomous vehicle according to environmental feedback information from a LIDAR device 802. At block 852, the method 850 includes receive information indicative of a LIDAR scan through a scanning zone. In some examples, the information can be received by the controller 804. The LIDAR device 802 may be associated with a vehicle, and the scanning zone may be or include an area in front, behind, or to the side of the vehicle. In some examples, the scanning zone may be configured to be directed to a vehicle in front of the vehicle on which the LIDAR is positioned.

At block 854, the method 850 includes generate a 3-D point map of the scanning zone based on information from the LIDAR system. The computer system 112 may be configured to generate a 3-D point map of positions of reflective features in the scanning zone, as discussed above.

At block 856, the method 850 includes generate a density profile of the 3-D point map as well as an elevation profile of the 3-D point map, as discussed above. In some examples, the density profile and elevation profile are generated by the controller 804.

At block 858, the method 850 includes determine whether an identified reflective feature includes solid material, the determination based on the density profile and elevation profile of the 3-D point map. In some examples, the determination is made by the controller 804. In one embodiment, the determination is made by finding the surface of a vehicle and then trailing back (towards the LIDAR device 802 on the autonomous vehicle) to identify where the exhaust plume begins.

In another embodiment, the controller 804 can be configured to use observations made about a given vehicle in the past to determine whether an object detected by the LIDAR device 802 includes solid material. In some examples, the controller 804 may determine a bounding box for a vehicle (e.g., an area in which the vehicle is present) over time. The bounding box corresponds to a predicted exterior surface of the point cloud indicated object, in this case, a vehicle located in front of the autonomous vehicle. Of course, the bounding "box" can generally take the form of a multi-sided closed shape defining the predicted outer boundaries of the object. When a bounding box of a vehicle is tracked over time, portions of the vehicle that do not fit into the bounding box are more likely to be an exhaust plume because solid structures will usually be persistently present in the scans, and will cause the bounding box to take them into account. Conversely, when, due to a sporadic event in scanning or the shape of the vehicle (e.g., a low flatbed pickup truck), the geometric features suggest that a large part of a vehicle is exhaust, the fact that those parts of the vehicle have been persistently tracked prevents them from being discarded by the navigation control systems operating the autonomous vehicle. Sometimes an exhaust plume persists in the scanning zone for long enough to be considered separate from the originating vehicle cluster in the 3-D point map. In this situation, having tracked the exhaust plume in the past produces very strong evidence in favor of discarding the entire exhaust plume cluster.

In yet another embodiment, past exhaust plume decisions can be used to determine whether an object detected by the LIDAR device 802 includes a solid material. In some examples, the controller 804 generates a record of each exhaust plume decision. The record of an exhaust plume decision contains a density profile and an elevation profile, each associated with the exhaust plume decision. Current density and elevation profiles are compared with the record of exhaust plume decisions. When a current density and elevation profile is similar to past density and elevation profiles in a past exhaust plume decision, the controller 804 will use the past exhaust plume decision to make a current decision. Keeping track of the history of exhaust plume decisions allows for future exhaust plume decisions involving similar density and elevation profiles to be made more quickly and with greater accuracy.

At block 860, the method 850 includes control the autonomous vehicle to avoid solid features in the map of solid objects 806 without avoiding non-solid features. In some embodiments, non-solid LIDAR-indicated features, such as exhaust plumes, are substantially ignored by the navigation control systems operating the autonomous vehicle. For example, referring to FIG. 1, the object avoidance system 144 and/or navigation/pathing system 142 can be provided with the map of solid objects 806 to automatically determine a path for the autonomous vehicle that avoids solid objects without avoiding exhaust plumes, even if the exhaust plumes are optically opaque. The map of solid objects 806 can be carried out by, for example, the controller 804 implemented as hardware and/or software modules including one or more of the computer system 112, the sensor fusion algorithm 138, the computer visions system 140, etc of the autonomous vehicle 100. The controller can analyze positions of the solid objects in the map of solid objects 806 in relation to a current path of the vehicle 100 to identify obstacles and/or interference with the vehicle 100 indicated by the map of solid objects 806. The controller 804, which can include hardware and/or software implemented modules including the navigation/pathing system 142, the obstacle avoidance system 144, etc. can determine a modified path for the autonomous vehicle 100. For example, the controller 804 can determine a path that minimizes interference with solid objects in the map of solid objects 806, or that maximizes passenger safety during an unavoidable collision/interference with an obstacle by the vehicle 100. The controller 804 can then control the autonomous vehicle 100 to navigate along the modified path. Thus, in some embodiments, the map of solid objects 806 is generated and/or updated repeatedly and used as feedback to inform real time navigation determinations made by an autonomous vehicle operating substantially without human control. As a result, some embodiments of the present disclosure provide for the map of solid objects 806 to be generated and/or updated at a refresh rate that is relevant to real time navigational determinations by an autonomous vehicle.

FIGS. 6, 7 and 8A-B present flowcharts describing processes employed separately or in combination in some embodiments of the present disclosure. The methods and processes described herein are generally described by way of example as being carried out by an autonomous vehicle, such as the autonomous vehicles 100, 200 described above in connection with FIGS. 1 and 2. For example, the processes described herein can be carried out by a LIDAR device 128 and associated optical sensors (e.g., the sensors 202 on vehicle 200) mounted to an autonomous vehicle (e.g., the vehicle 200) in communication with a computer system 112, sensor fusion algorithm module 138, and/or computer vision system 140.

As used herein a "scanning zone" generally refers to a region of a scanned environment scanned by a single LIDAR device, or a combination of LIDAR devices, that is completely sampled in a complete scan by the LIDAR device. That is, for a LIDAR device operated to continuously actively map its surroundings for reflective features, the scanning zone is the complete region mapped before returning to map the same point again. Generally, the scanning zone referred to herein is defined with reference to the point of view of the LIDAR device in terms of azimuth (e.g., angle along the horizon) and altitude (e.g., angle perpendicular to the horizon) with respect to the point of view of the LIDAR device. Thus, the geographic location mapped by the scanning zone of a LIDAR device is not fixed, but rather moves with the LIDAR device. For example, the scanning zone can be considered a bubble surrounding a particular LIDAR device with dimensions defined by the maximum distance sensitivity of the LIDAR device.

In some embodiments, a single laser in the LIDAR device (e.g., the LIDAR device 302 discussed in connection with FIGS. 3A-3C) can have a scanning range of approximately 150 meters distance, a thirty degree vertical ("altitude") field of view, and approximately a thirty degree horizontal ("azimuth") field of view. Additional lasers included in the LIDAR device can have complementary ranges and fields of view as well so as to provide sufficient coverage of an environmental scene to inform navigational determinations. In some embodiments, the azimuth range of the scanning zone can be approximately 360 degrees, or a divisor thereof, such as 180, 90, 60, etc. to allow for 360 degree coverage by an even number of similar such LIDAR devices. In some embodiments, the altitude range can extend from 0 to 180 degrees. In some embodiments, the altitude range of the scanning zone can extend by an approximately equal number of degrees to either side of the horizon, such as 30 degrees either side of the horizon (60 to 120 degrees altitude), 20 degrees either side of the horizon (70 to 110 degrees altitude), etc. Of course, the altitude range can also be an incomplete coverage of the available 0 to 180 degree range that is biased above or below the horizon, such as providing coverage up to 45 degrees above the horizon and 15 degrees below the horizon (45 to 105 degrees altitude), to take just one example. Of course, as with the azimuth ranges, the altitude ranges can be divided substantially equally between multiple LIDAR devices, such as in 30 degree sections, 20 degree sections, 15 degree sections, etc.

Furthermore, a complete scan is referred to herein as being completed within a scanning interval, which can be the time required for performing a complete scan of the scanning zone. In other words, a given point in the scanning zone is generally scanned on an interval given by the scanning interval, with every other point in the scanning zone being scanned in the interim.

Figure 9:
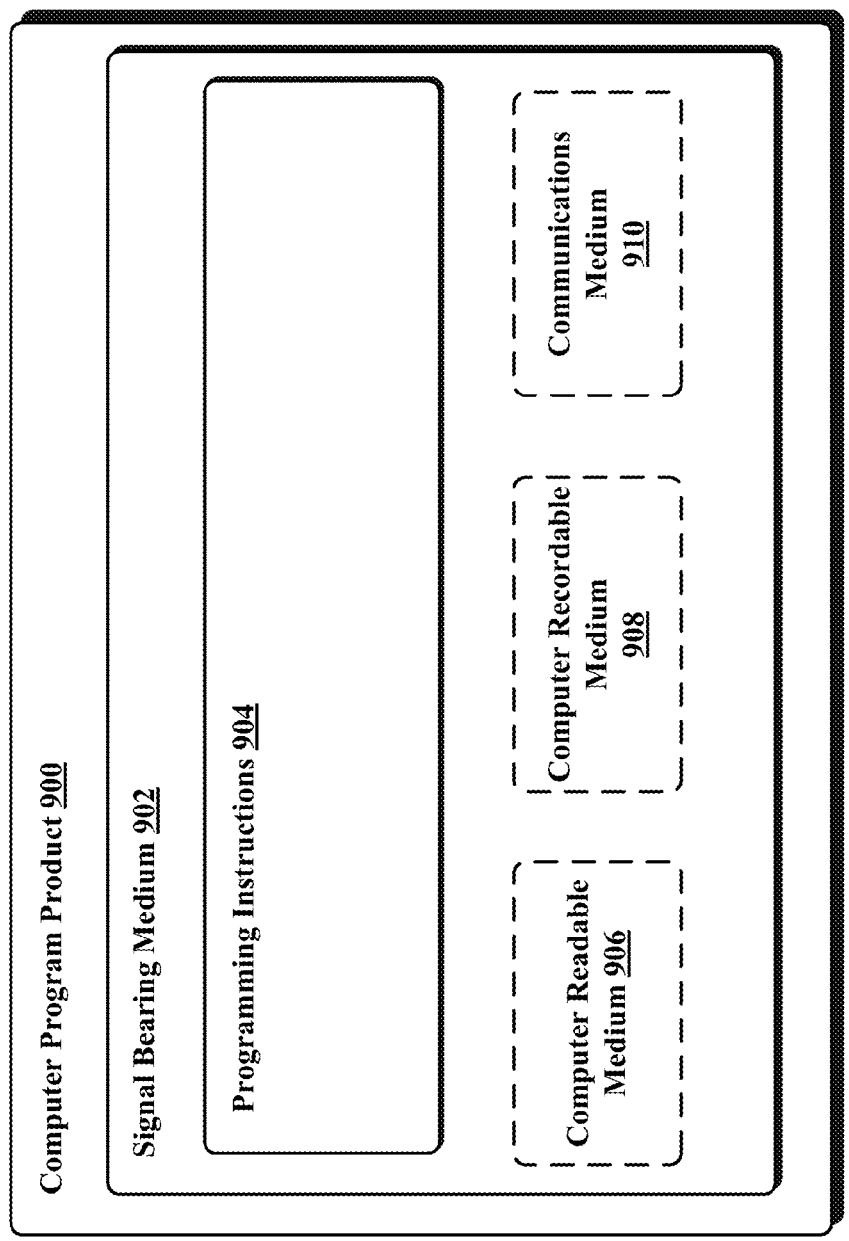
FIG. 9 depicts a computer-readable medium configured according to an example embodiment.

FIG. 9 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., the instructions 115 stored on the data storage 114 of the computer system 112 of vehicle 100). FIG. 9 is a schematic illustrating a conceptual partial view of an example computer program product that includes a computer program for executing a computer process on a computing device, arranged according to at least some embodiments presented herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-8. In some examples, the signal bearing medium 902 can be a computer-readable medium 906, such as, but not limited to, a hard disk drive, a Compact Disc (CD), a Digital Video Disk (DVD), a digital tape, memory, etc. In some implementations, the signal bearing medium 902 can be a computer recordable medium 908, such as, but not limited to, memory, read/write (R/W) CDs, R/W DVDs, etc. In some implementations, the signal bearing medium 902 can be a communications medium 910, such as, but not limited to, a digital and/or an analog communication medium (e.g., a fiber optic cable, a waveguide, a wired communications link, a wireless communication link, etc.). Thus, for example, the signal bearing medium 902 can be conveyed by a wireless form of the communications medium 910.

The one or more programming instructions 904 can be, for example, computer executable and/or logic implemented instructions. In some examples, a computing device such as the computer system 112 of FIG. 1 is configured to provide various operations, functions, or actions in response to the programming instructions 904 conveyed to the computer system 112 by one or more of the computer readable medium 906, the computer recordable medium 208, and/or the communications medium 910.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope being indicated by the following claims.

We claim:

1. A method for identifying exhaust from a vehicle, the method comprising:
   receiving, by a computing device, information indicative of a light detection and ranging (LIDAR) scan of an environment including the vehicle, the LIDAR scan characterized by a scanning zone;
   generating, by the computing device, a point map of the scanning zone based on the received information, the point map comprising a plurality of points;
   generating, by the computing device, a density profile of the point map, the density profile indicative of density of one or more regions in the scanning zone characterized at one or more distances;
   generating, by the computing device, an elevation profile of the point map, the elevation profile indicative of elevation of the one or more features in the scanning zone characterized at one or more distances; and
   based on the density profile and the elevation profile, the computing device classifying regions of the scanning zone as including a surface of the vehicle or an exhaust gas from the vehicle.

2. The method according to claim 1, further comprising:
   determining, by the computing device, a surface of the vehicle based on a highest value in the density profile; and
   determining, by the computing device, an exhaust plume based on a lowest value in the elevation profile.

3. The method according to claim 1, wherein a LIDAR device is configured to complete a scan of the scanning zone during a scanning interval, and wherein classifying regions of the scanning zone is based on information received by the computing device during one or more previous scanning intervals.

4. The method according to claim 1, wherein classifying regions of the scanning zone comprises the computing device making a determination of whether a feature in the scanning zone includes an exhaust plume, and the method further comprises:
- generating, by the computing device, a record of exhaust plume determinations, the record comprising one or more density profiles and one or more elevation profiles associated with one or more exhaust plume determinations; and
- classifying, by the computing device, regions of the scanning zone based on the record of exhaust plume determinations.

5. The method according to claim 1, wherein classifying the regions of the scanning zone comprises the computing device classifying a given region as including the vehicle, and the method further comprises:
- processing, by the computing device, a bounding box of the vehicle over time, wherein the bounding box corresponds to a predicted exterior surface of the vehicle based on a group of points located in the scanning zone over time; and
- associating, by the computing device, a group of points located outside of the bounding box with an exhaust plume.

6. The method according to claim 1, wherein classifying the regions of the scanning zone comprises the computing device classifying a given region as including the vehicle, and the method further comprises:
- processing, by the computing device, a bounding box of the vehicle over time, wherein the bounding box corresponds to a predicted exterior surface of the vehicle based on a group of points located in the scanning zone over time; and
- associating, by the computing device, a group of points located inside of the bounding box with the vehicle.

7. The method according to claim 1, wherein classifying regions of the scanning zone comprises the computing device determining whether a feature includes a solid material.

8. The method according to claim 7, further comprising:
- generating, by the computing device, a map of the one or more features in the scanning zone that include a solid material;
- determining, by the computing device, a path of an autonomous vehicle that avoids the features in the scanning zone that include a solid material; and
- controlling, by the computing device, the autonomous vehicle to navigate along the path.

9. An autonomous vehicle system comprising:
a light detection and ranging (LIDAR) device; and
a controller configured to:
- generate a point map of a scanning zone of the LIDAR device, the point map comprising a plurality of points;
- generate a density profile of the point map, the density profile indicative of density of one or more regions in the scanning zone characterized at one or more distances;
- generate an elevation profile of the point map, the elevation profile indicative of elevation of one or more features in the scanning zone characterized at one or more distances; and
- based on the density profile and the elevation profile, classifying regions of the scanning zone as including a surface of the vehicle or an exhaust gas from the vehicle.

10. The autonomous vehicle system according to claim 9, wherein the controller is further configured to:
- determine a surface of the vehicle based on a highest value in the density profile; and
- determine an exhaust plume based on a lowest value in the elevation profile.

11. The autonomous vehicle system according to claim 9, wherein the controller is configured to classify regions of the scanning zone by determining whether a feature includes a solid material, and wherein the controller is further configured to:
- generate a map of the one or more features in the scanning zone that include a solid material;
- determine a path of an autonomous vehicle that avoids the features in the scanning zone that include a solid material; and
- control the autonomous vehicle to navigate along the path.

12. The autonomous vehicle system according to claim 9, wherein the controller is configured to classify regions of the scanning zone by making a determination of whether a feature in the scanning zone includes an exhaust plume, and wherein the controller is further configured to:
- generate a record of exhaust plume determinations, the record comprising one or more density profiles and one or more elevation profiles associated with one or more exhaust plume determinations; and
- classify regions of the scanning zone based on the record of exhaust plume determinations.

13. The autonomous vehicle system according to claim 9, wherein classifying the regions of the scanning zone comprises classifying a given region as including the vehicle, and wherein the controller is further configured to:
- process a bounding box of the vehicle over time, wherein the bounding box corresponds to a predicted exterior surface of the vehicle based on a group of points located in the scanning zone over time; and
- associate a group of points located outside of the bounding box with an exhaust plume.

14. The autonomous vehicle system according to claim 9, wherein classifying the regions of the scanning zone comprises classifying a given region as including the vehicle, and wherein the controller is further configured to:
- process a bounding box of the vehicle over time, wherein the bounding box corresponds to a predicted exterior surface of the vehicle based on a group of points located in the scanning zone over time; and
- associate a group of points located inside of the bounding box with the vehicle.

15. A non-transitory computer readable medium storing instructions that, when executed by one or more processors in a computing device, cause that computing device to perform functions, the functions comprising:
- receiving information indicative of a light detection and ranging (LIDAR) scan of an environment including a vehicle, the LIDAR scan characterized by a scanning zone;
- generating a point map of the scanning zone based on the received information, the point map comprising a plurality of points;
- generating a density profile of the point map, the density profile indicative of density of one or more regions in the scanning zone characterized at one or more distances;
- generating an elevation profile of the point map, the elevation profile indicative of elevation of the one or more features in the scanning zone characterized at one or more distances; and
- based on the density profile and the elevation profile, classifying regions of the scanning zone as including a surface of the vehicle or an exhaust gas from the vehicle.

16. The non-transitory computer readable medium according to claim 15, wherein the functions further comprise:

determining a surface of the vehicle based on a highest value in the density profile; and determining an exhaust plume based on a lowest value in the elevation profile.

17. The non-transitory computer readable medium according to claim 15, wherein classifying regions of the scanning zone comprises determining whether a feature includes a solid material, and wherein the functions further comprise:

generating a map of the one or more features in the scanning zone that include a solid material;

determining a path of an autonomous vehicle that avoids the features in the scanning zone that include a solid material; and controlling the autonomous vehicle to navigate along the path.

18. The non-transitory computer readable medium according to claim 15, wherein classifying regions of the scanning zone comprises making a determination of whether a feature in the scanning zone includes an exhaust plume, and wherein the functions further comprise:

generating a record of exhaust plume determinations, the record comprising one or more density profiles and one or more elevation profiles associated with one or more exhaust plume determinations; and classifying regions of the scanning zone based on the record of exhaust plume determinations.

19. The non-transitory computer readable medium according to claim 15, wherein classifying the regions of the scanning zone comprises classifying a given region as including the vehicle, and wherein the functions further comprise:

processing a bounding box of the vehicle over time, wherein the bounding box corresponds to a predicted exterior surface of the vehicle based on a group of points located in the scanning zone over time; and associating a group of points located outside of the bounding box with an exhaust plume.

20. The non-transitory computer readable medium according to claim 15, wherein classifying the regions of the scanning zone comprises classifying a given region as including the vehicle, and wherein the functions further comprise:

processing a bounding box of the vehicle over time, wherein the bounding box corresponds to a predicted exterior surface of the vehicle based on a group of points located in the scanning zone over time; and associating a group of points located inside of the bounding box with the vehicle.

\* \* \* \* \*